April 20, 1943.  C. SCHLUMBERGER  2,317,304
APPARATUS FOR THE ELECTRICAL SURVEYING OF BORE HOLES
Filed May 11, 1935  2 Sheets-Sheet 1

April 20, 1943. C. SCHLUMBERGER 2,317,304
APPARATUS FOR THE ELECTRICAL SURVEYING OF BORE HOLES
Filed May 11, 1935 2 Sheets-Sheet 2
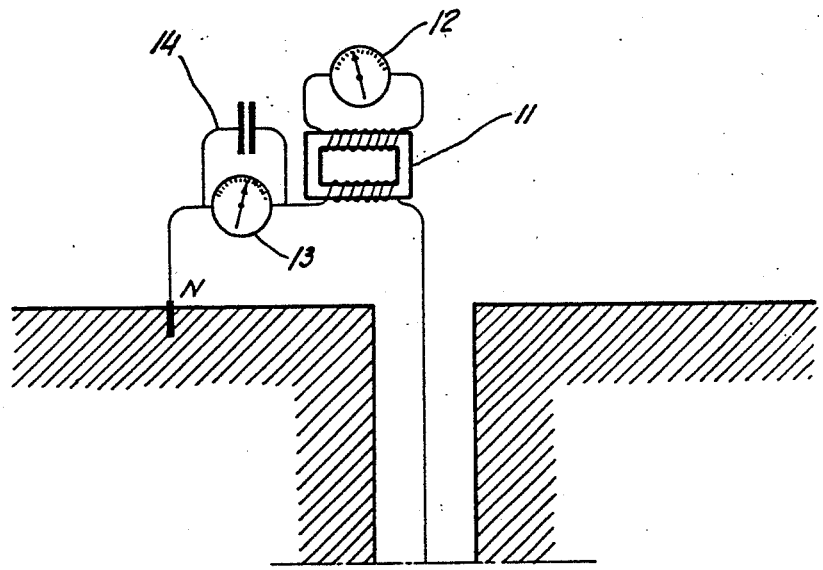
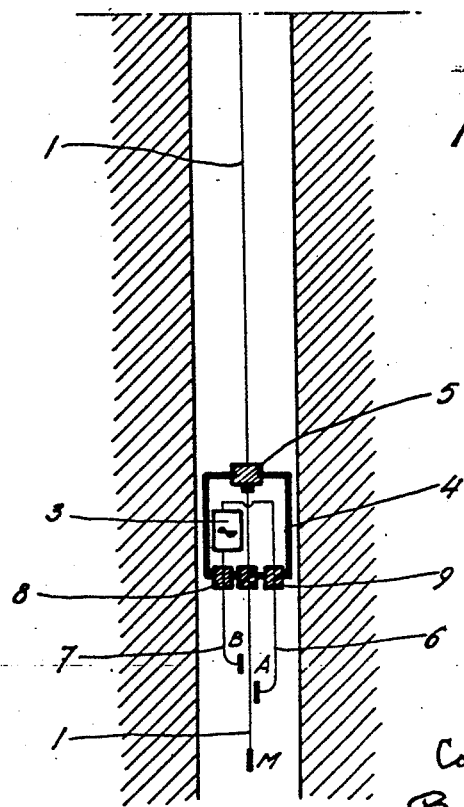
Fig. 2
Inventor:-
Conrad Schlumberger
By Mauro & Lewis
Attorneys Patented Apr. 20, 1943

2,317,304

UNITED STATES PATENT OFFICE 2,317,304

APPARATUS FOR THE ELECTRICAL SURVEYING OF BOREHOLES

Conrad Schlumberger, Paris, France; Anne Marguerite Louise Doll, administratrix of said Conrad Schlumberger, deceased, assignor, by mesne assignments, to Schlumberger Well Surveying Corporation, Houston, Tex., a corporation of Delaware Application May 11, 1935, Serial No. 21,072
In France April 5, 1935

29 Claims. (Cl. 175—182)

In the U. S. Patent No. 1,819,923 which relates to "an electrical process and apparatus for the determination of the nature of the geological formations traversed by drill holes," there is described a method of measuring the electrical resistivity of the different formations traversed by a bore hole (the measurements being taken in the uncased part of the hole previously filled with liquid); by which measurements it is possible to determine the nature of the strata without taking samples mechanically.

This process, which has been applied on a very large scale in the course of the last few years, in particular in oil exploration, is carried out by means of a three electrode device which is lowered into the bore hole at the end of a three-conductor insulated cable, one of the said electrodes being connected to one terminal of a source of current located above ground, the other terminal of said source being grounded, and the two other electrodes being connected to measuring instruments also located above ground and serving to measure the differences of potential produced by ohmic effect between the said two electrodes.

The Patent 1,819,923 referred to also envisages another device for carrying out the process above defined and according to which a single electrode is lowered into the drill hole at the end of a single insulated cable; the total resistance of the circuit constituted by the conductor and the electrode is measured and therefrom the resistance of the electrode and thus that of the formations at corresponding depth are deduced by subtracting the resistance of the conductor which is known a priori.

The present invention has for its object to provide an improved device making possible the use of a single conductor cable while maintaining the three electrodes, whereby accurate results may be obtained even at the greatest depths. It is to be noted, however, that the three electrodes of the present invention function differently from those of said Patent No. 1,819,923, as will be seen from the description which follows.

This device is essentially characterised by the fact that the three electrodes are attached to a single-conductor insulated cable from which the source of current is mechanically suspended in the neighbourhood of the said electrodes so as to be lowered simultaneously therewith into the bore holes to be surveyed. Two of the said electrodes are connected electrically to the terminals of the said source without having any electrical connection with the insulated cable conductor and serve to send the current into the hole, whilst the third electrode—which serves to collect the potentials created in the earth by the passage of the said current—is connected electrically to the lower extremity of the insulated conductor whose upper extremity is connected electrically to one terminal of a potential-measuring instrument located at the earth's surface and whose other terminal is connected to a point on the earth's surface.

The invention also provides means for measuring simultaneously the spontaneous potentials which exist in the liquid of the bore hole at the depths of the several porous strata. These means, as well as other characteristics of the invention, are set forth in detail in the following description in which reference is made to the accompanying drawings, given only as examples.

In the drawings:

Figure 2 illustrates a modification comprising additional means for measuring the spontaneous potentials due to porous strata.

Figure 1:
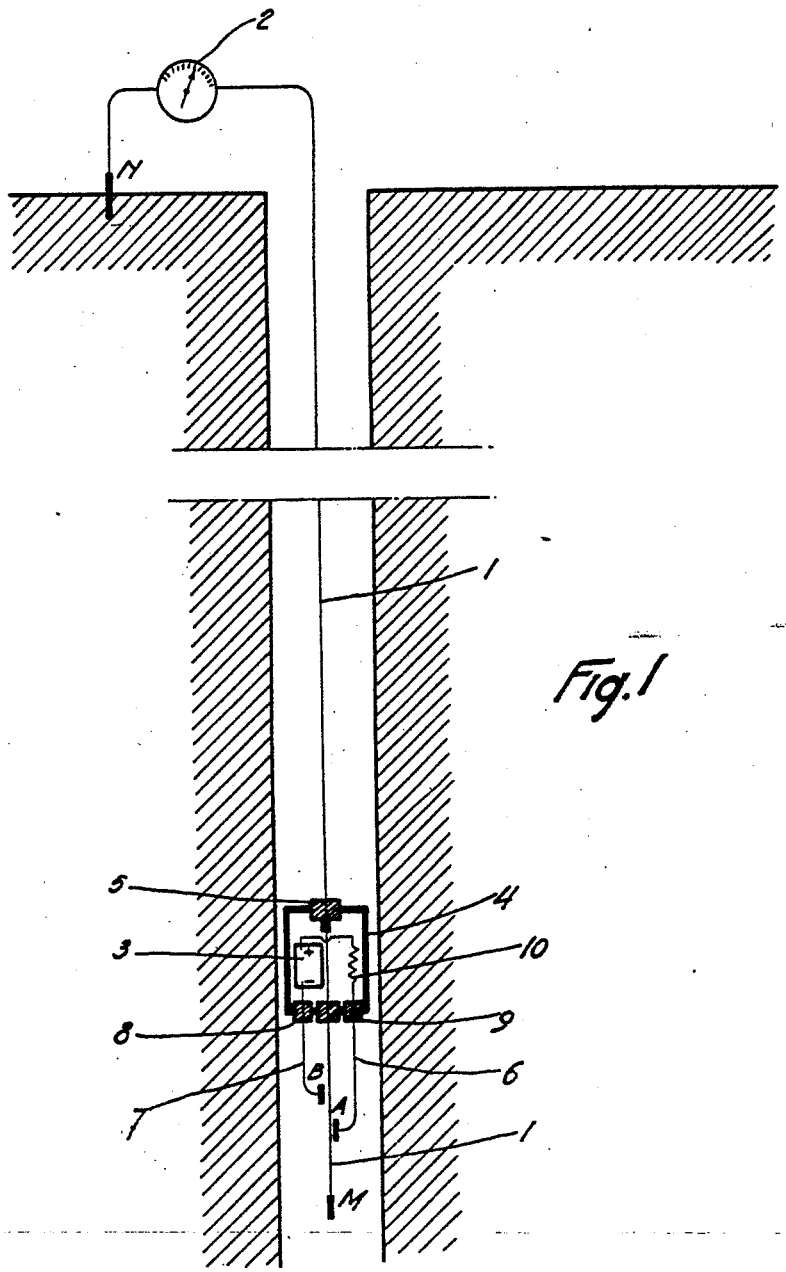
Figure 1 is a diagrammatic representation of one embodiment of the invention.

Referring first to Fig. 1, the arrangement comprises a single-conductor cable 1 electrically connected at its lower end to the electrode M adapted to collect the potentials in the bore hole. Said cable is connected at its upper extremity to one terminal of a potential-measuring instrument 2, for instance a millivoltmeter, or preferably a potentiometer, whose other terminal is grounded at N, for instance by means of a metal peg. 3 is the source of current which is enclosed, for instance, in a water-tight container 4 attached to the cable by a water-tight plug 5. The electrodes for transmitting the current are represented at A and B. In the illustrated embodiment they are connected to the current source 3 by insulated leads 6 and 7 passing into the water-tight container through water-tight plugs 8 and 9.

The current source may be constituted, for example, by a dry-cell battery or by an accumulator battery. In the circuit connecting the battery to electrodes A and B is intercalated a resistance 10, preferably by connection in series as shown in Fig. 1, which is high compared with the anticipated resistances between the electrodes A and B so that the intensity $i$ of the current transmitted by the latter is practically constant and of known value irrespective of the electrical resistance of the ground surrounding these electrodes.

In order to facilitate the lowering of the arrangement into the hole there may be attached at the lower end a weight (not shown in the figure) fixed to the cable below the electrode M by means of an insulated connection (likewise not shown).

The distances $AM=r$ and $BM=r'$ are made large in comparison with the diameter of the bore hole in order to eliminate as far as possible the influence, upon the distribution of the potentials, of the water filling the hole. The distances $r$ and $r'$, the intensity $i$ of the current transmitted, the difference of potential $\Delta V$ measured between the electrode M and the surface of the soil by means of the measuring apparatus 2 being known, it is possible to calculate the mean resistivity $\rho$ of the earth in the neighbourhood of the device B. A. M. It can be shown that this mean resistivity is given by the formula:

$$\rho = \frac{4\pi}{i} \cdot \frac{rr'}{r'-r} \cdot \Delta V$$

In the above description the differences of spontaneous potential which may exist in the liquid of the bore hole at the level of porous strata even in the absence of any artificial current have been neglected in order to simplify the explanation. Those spontaneous differences of potential are due to electro-filtration and electro-osmosis phenomena and their measurement constitutes the subject matter of Patent No. 1,913,293 entitled "Electrical process for the geological investigation of the porous strata traversed by drill holes."

To the difference of potential $\Delta V$ created between M and N as a result of the passage of current through the earth is thus added the difference of potential $\Delta V'$ due to the porous strata so that the actual difference of potential measured is equal to $(\Delta V + \Delta V')$.

$\Delta V'$ may be measured by raising the device to the surface and disconnecting the source of current, then lowering the device again to the bottom of the bore hole and repeating the measurement without transmitting current. Thus, for each depth, the difference of potential $\Delta V'$ is measured, and by subtracting this value from the difference of potential $(\Delta V + \Delta V')$, which has been previously measured at the same depth, there is finally obtained the potential difference $\Delta V$ due only to the passage of current.

It is also possible in certain cases to eliminate the influence of $\Delta V'$ by employing a current of such intensity that $\Delta V'$ is practically negligible compared with $\Delta V$.

Finally, and this is generally the best method, an alternating current-supply source can be used. It is then sufficient to employ at the surface a potential-measuring instrument which is responsive only to alternating currents. Such instrument may comprise, for example, a transformer whose secondary is connected to the terminals of an alternating current measuring instrument and whose primary replaces the measuring apparatus 2. The difference of potential $\Delta V$ due to the passage of current is then alternating. It is applied to the primary of the transformer and poduces in the secondary thereof a difference of potential $k\Delta V$ which is read on the measuring instrument, $k$ being a constant which is characteristic of the transformer. The difference of spontaneous potential $\Delta V'$ is, on the other hand, continuous and simply creates in the primary of the transformer a direct current which is without effect on the secondary and, consequently, on the measuring instrument.

In this latter case it is possible moreover to measure $\Delta V'$ simultaneously with $\Delta V$ by connecting in series with the primary of the transformer a potential measuring instrument responsive only to direct current and constituted for example by a millivoltmeter of the moving coil and permanent magnet type which is advantageously shunted by a condenser in order to avoid, to some extent, oscillations of the needle about its position of equilibrium which would be caused by the flow of alternating current due to $\Delta V$.

In Figure 2 of the drawings is shown an embodiment of this latter device.

The source of current 3 which supplies alternating current may be constituted, for example, by a small alternator driven by a direct current motor which is itself fed by a battery of accumulators. The alternator, the motor and the battery may, in this case, be contained in the watertight container 4. The alternator is arranged to supply a current of known intensity, and this may be achieved by making the internal resistance of the alternator high compared with that between the electrodes A and B caused by the anticipated resistance and other characteristics of the ground surrounding the electrodes.

The transformer, whose primary is in series with the conductor 1 which is connected to the electrode M, is shown at 11 and the transformer secondary is connected to the terminals of an alternating current-measuring instrument 12. At 13 is represented a measuring instrument responsive only to direct currents and which is shown shunted by a condenser 14 adapted to by-pass the greater part of the alternating current in order to avoid exaggerated vibrations of the needle of the instrument 13.

By employing recording apparatus for the measurement of $\Delta V$ and $\Delta V'$ and by moving the measuring arrangement in a continuous manner in the bore hole it is possible to trace directly diagrams which give, in function of the depth, one, the variations of $\Delta V$ and the other the variations of $\Delta V'$, the first of these diagrams giving the resistivity of the formations to the alternating current at different depths and the other giving for the same depths information as to the porosity of the strata, the nature of the liquids impregnating said strata, and the pressure in these strata.

By "parameter" as used in the appended claims, is meant any one of the characteristics of the variable current flowing through the measurement electrodes; for instance, the intensity of said current, or the alternating difference of potential between the electrodes, or the potential difference between two points of the circuit. Since the resistance of the conductor is known, obviously the measurement of any one of the above quantities permits the determination of the others. For the reasons already given, there may thus be determined the approximate value of the resistivity of the soils, as has been explained.

What I claim is:

1. A device for measuring in a bore hole filled with liquid the electrical resistivity of the formations traversed by said bore hole, said device comprising a source of current adapted to be lowered into said bore hole in the neighborhood of the formation to be surveyed, two electrodes adapted to be submerged in said liquid and connected to the terminals of the source of current, and means for measuring the differences of potential created in the formations by said source of current.

2. A device for measuring in a bore hole filled with liquid the electrical resistivity of the formations traversed by said bore hole, said device comprising a source of current adapted to be lowered in said bore hole in the neighborhood of the formation to be surveyed, two electrodes adapted to be submerged in said liquid and connected to the terminals of the source of current, and means for measuring the difference of potential created between a point in the bore hole and a point at the surface of the ground by said source of current.

3. A device for measuring in a bore hole filled with a non-insulating liquid the electrical resistivity of the formations traversed by said bore hole, said device comprising a source of alternating current adapted to be lowered into said bore hole in the neighborhood of the formation to be surveyed, two electrodes adapted to be submerged in said liquid and connected to the terminals of the source of current, and means for measuring the alternating difference of potential created by said source of current.

4. Apparatus for measuring in a bore hole filled with liquid the electrical resistivity of the formations traversed by said bore hole, said apparatus comprising a single-conductor cable and a member attached to the end thereof that is lowered into the bore hole, which member comprises a water-tight casing, a source of current therein, two electrodes outside said casing forming the terminals of a local circuit which includes said source of current, and a third electrode, which is electrically connected with one extremity of said conductor, the other extremity thereof being grounded through a measuring instrument.

5. Apparatus for measuring in a bore hole filled with liquid the electrical resistivity of the formations traversed by said bore hole, said apparatus comprising a single-conductor cable and a member attached to the end thereof that is lowered into the bore hole, which member comprises a water-tight casing, a source of alternating current therein, two electrodes outside said casing forming the terminals of a local circuit which includes said source of alternating current, and a third electrode, which is electrically connected with one extremity of said conductor, the other extremity thereof being grounded through an alternating current measuring instrument.

6. Apparatus for measuring in a bore hole filled with liquid the electrical resistivity of the formations traversed by said bore hole, said apparatus comprising a single-conductor cable and a member attached to the end thereof that is lowered into the bore hole, which member comprises a water-tight casing, a source of current therein, two electrodes outside said casing forming the terminals of a local circuit which includes said source of current, and a third electrode which is electrically connected with one extremity of said conductor whose other extremity is grounded through a measuring instrument, said electrodes being so spaced that the distance between each of the local circuit electrodes and the third electrode is large in comparison with the diameter of the bore hole.

7. A device for measuring in a bore hole filled with liquid the electrical resistivity of the formations traversed by said bore hole, said device comprising a source of current adapted to be lowered into said bore hole in the neighborhood of the formation to be surveyed, two electrodes adapted to be submerged in said liquid at a constant distance from one another and connected to the respective terminals of the source of current, and means for measuring the differences of potential created in the formations by said source of current, the unit constituted by the source of current and the electrodes connected to the terminal of said source being adapted to maintain substantially constant the intensity of the current emitted in the bore hole at the different depths therein.

8. A device for measuring in a bore hole filled with liquid the electrical resistivity of the formations traversed by said bore hole, said device comprising a source of direct current adapted to be lowered into said bore hole in the neighborhood of the formation to be surveyed, two electrodes adapted to be submerged in said liquid at a constant distance from one another and connected to the respective terminals of the source of current, and means for measuring the difference of potential created in the formation of said source of current, a resistance which is high compared with the resistance of the ground surrounding said electrodes being intercalated in the circuit connecting the source of current and these electrodes.

9. An electrical device for measuring, in the uncased part of a bore hole which has been previously filled with liquid, the electrical resistivity of the formations, and comprising, three electrodes lowered in the bore hole, a source of current lowered in the bore hole in the neighbourhood of the said electrodes, a single conductor insulated cable, means for mechanically attaching said source of current to said cable, means for electrically connecting two of the said electrodes to the terminals of said source of current, means for measuring the differences of potential created by the current thus sent into the bore hole, said means being electrically connected, on the one hand through the insulated cable to the third electrode, and on the other hand to a point on the surface of the soil.

10. An electrical device for measuring, in the uncased part of a bore hole which has been previously filled with liquid, the electrical resistivity of the formations traversed by said bore hole, for the purpose of determining the nature of said formations, and comprising, three electrodes lowered in the bore hole, a source of alternating current lowered in the hole in the neighbourhood of said electrodes, a single conductor insulated cable, means for mechanically suspending said source of current from the said cable, means for electrically connecting two of the said electrodes to the terminals of said source of current, means for measuring the differences of potential created by the alternating current thus sent into the bore hole, means for measuring the spontaneous potential differences existing at the depth of the porous strata of the bore hole, said means being electrically connected, on the one hand through the insulated cable to the third electrode, and on the other hand to a point on the surface of the soil.

11. An electrical device for measuring, in the uncased part of a bore hole which has been previously filled with liquid, the electrical resistivity of the formations traversed by said bore hole, for the purpose of determining the nature of said formations, and comprising, three electrodes lowered in the liquid of the bore-hole, a source of alternating current lowered in the bore hole in the neighbourhood of the said electrodes, a single conductor insulated cable, said source of current being mechanically attached to said cable, means for electrically connecting two of the said electrodes to the terminals of said source of current, a transformer whose primary is electrically connected, on the one hand through the insulated cable to the third electrode, and on the other hand to a point on the surface of the soil, means for measuring the differences of potential created by the alternating current thus sent into the bore-hole, the said means being electrically connected to the secondary of the transformer, and means connected in series with the primary of the transformer for measuring the spontaneous differences of potential existing at various depths of the porous strata traversed by the bore-hole.

12. A device for surveying formations traversed by a bore hole filled with liquid which comprises: means for passing an alternating electric current in the bore hole and in the adjacent formations; an electrode capable of being displaced in the bore hole; a second electrode which is grounded; an insulated conductor connecting said electrodes; means responsive to continuous currents only; and means responsive to alternating currents only, said several measuring means being adapted for measuring simultaneously the spontaneous difference of potential existing between said electrodes and a parameter depending upon the conditions due to the passage of said current.

13. A device for surveying formations traversed by a bore hole filled with liquid which comprises: means for passing an alternating electric current in the bore hole and in the adjacent formations; an electrode capable of being displaced in the bore hole; a second electrode which is grounded; an insulated conductor connecting said electrodes; a condenser in circuit with said insulated conductor; an apparatus for measuring the continuous differences of potential connected in parallel with said condenser; and an apparatus for measuring at least one of the parameters which depend upon the electric conditions created in the adjacent formations by the alternating current passing through the insulated conductor.

14. A device for surveying formations traversed by a bore hole filled with liquid which comprises: means for passing an alternating electric current in the bore hole and in the adjacent formations; an electrode capable of being displaced in the bore hole; a second electrode which is grounded; an insulated conductor connecting said electrodes; a condenser in the circuit of said insulated conductor, an apparatus for measuring the continuous difference of potential connected in parallel with said condenser; and an apparatus for measuring the alternating differences of potential between the two electrodes.

15. Device for surveying the formations traversed by a drill hole, which device comprises: means for creating a variable electric field in the drill hole; electrodes for testing said field; an electric circuit whereof said electrodes form the respective terminals, and means for separately measuring the variable and direct currents flowing through said circuit.

16. Device for surveying the formations traversed by a drill hole, which device comprises: means for creating an alternating electric field in the drill hole; two electrodes, one in proximity to the formations to be surveyed and the other grounded, for testing said alternating field; an insulated conductor between said electrodes; and means for separately measuring the characteristics of the alternating and the direct currents flowing through said conductor.

17. Device for surveying the formations traversed by a drill hole, which device comprises: means for creating an alternating electric field in the drill hole; electrodes for testing said field; an electric circuit whereof said electrodes form the respective terminals; and means for measuring the characteristics of the alternating and the direct currents flowing through said circuit.

18. A system for logging an oil well comprising a pair of electrodes electrically connected to a source of power and adapted to set up a field of electrical energy at successive points in the well, said field including the earth around the well and being affected thereby, a pair of electrically connected measuring electrodes adapted to pick up the voltage due to said field at said successive points and to pick up the natural earth potential at said points and means in the circuit connecting said measuring electrodes for separately and simultaneously exhibiting functions of the aforesaid respective voltages.

19. Apparatus for determining the location and character of strata penetrated by a bore hole containing a liquid comprising means for producing alternating currents within the strata surrounding the bore hole, an exploratory electrode and means for separately automatically recording simultaneously the alternating component and any direct component of the potential of said electrode relative to a reference datum.

20. Apparatus for determining the location and character of strata penetrated by a bore hole containing a liquid comprising means for producing alternating currents within the strata surrounding the bore hole, an exploratory electrode, and means for separately recording simultaneously the alternating component and any direct component of the potential of said electrode relative to a reference datum.

21. Apparatus for determining the location and character of strata penetrated by a bore hole containing a liquid, comprising means for producing alternating currents within the strata surrounding the bore hole, an exploratory electrode, and means for separately and simultaneously exhibiting a function of the alternating component and a function of any direct component of the potential of said electrode.

22. Apparatus for logging an oil well, comprising means for setting up a field of electrical energy within the strata traversed by the well, an exploratory electrode adapted to pick up the voltage due to said field and to pick up the natural earth potential, and means for separately and simultaneously exhibiting functions of the aforesaid respective voltages.

23. The method of determining the apparent average specific resistivity of a stratum penetrated by a bore hole containing a liquid comprising lowering within the bore hole three electrodes having predetermined spacing from each other, supplying reversed current to two of the electrodes within the bore hole, and determining the potential of the third electrode relative to a reference datum.

24. A method of simultaneously investigating spontaneous potentials and another subject of interest in a bore hole, comprising the steps of picking up in the bore hole potentials indicative of spontaneous potentials existing therein, simultaneously producing in the bore hole an electrical value which is separably different from said picked up potentials and which is a function of a given subject to be investigated, superimposing said picked up potentials and electrical value, transmitting said superimposed potentials and electrical value to the surface of the earth, and obtaining separate indications of said obtained potentials and electrical value.

25. A method of investigating simultaneously an electrical property of earth formations traversed by a bore hole and spontaneous potentials existing therein, comprising passing alternating current through the surrounding formations, picking up in the bore hole alternating current values produced by said passage of current through the formations, which values are a function of an electrical property of the formations, picking up in the bore hole direct current values related to spontaneous potentials existing therein, superimposing said alternating and direct current values, transmitting said superimposed values to the surface of the earth, and separately obtaining indications of said values.

26. A method of investigating simultaneously an electric property of earth formations traversed by a bore hole and spontaneous potentials existing therein, comprising, passing alternating current through the surrounding formations at different depths in the bore hole, picking up in the bore hole, for each of said depths, an electrical parameter related to the flow of current through the formations, and a direct current value related to spontaneous potentials existing in the bore hole, superimposing the direct current value obtained for each of said depths and the electrical parameter corresponding thereto, transmitting the superimposed direct current value and electrical parameter for each of said depths to the surface of the earth, and obtaining separate indications of the direct current value and electrical parameter obtained for each of said different depths.

27. A method of investigating simultaneously the electrical resistivity of earth formations traversed by a bore hole containing a conducting liquid and spontaneous potentials existing therein, comprising moving at least three longitudinally spaced apart electrodes through the bore hole, passing alternating current through two of said electrodes, thereby creating an alternating electric field in the surrounding formations, simultaneously picking up between a ground point and the third of said electrodes an alternating potential difference produced by said electric field in the formations and a direct potential difference produced by spontaneous potentials in the bore hole, and providing separate indications of said alternating and direct potential differences.

28. A method of investigating simultaneously an electrical property of earth formations traversed by a bore hole and spontaneous potentials existing therein, comprising, passing alternating current from a point in the bore hole through the surrounding formations, picking up the alternating potential difference produced between a ground point and a second point spaced apart from said current emitting point by the passage of said current through the formations, picking up a direct current value produced between said second point and a ground point by spontaneous potentials in the bore hole, superimposing said alternating potential difference and direct current value, transmitting said superimposed alternating potential difference and direct current value to the surface of the earth, obtaining separate indications of said alternating potential difference and direct current value, and repeating the foregoing steps at different depths in the bore hole.

29. A method of investigating simultaneously an electric property of earth formations traversed by a bore hole and spontaneous potentials existing therein, comprising, passing periodically variable current through the surrounding formations at different depths in the bore hole, picking up in the bore hole, for each of said depths, an electrical parameter related to the flow of current through the formations, and a direct current value related to spontaneous potentials existing in the bore hole, superimposing the direct current value obtained for each of said depths and the electrical parameter corresponding thereto, transmitting the superimposed direct current value and electrical parameter for each of said depths to the surface of the earth, and recording, simultaneously, separate curves showing variations of said electrical parameter and of said direct current value, both as a function of the depth in the bore hole.

CONRAD SCHLUMBERGER.